United States Patent [19]
Shiragaki et al.

[11] Patent Number: 5,471,332
[45] Date of Patent: Nov. 28, 1995

[54] HITLESS SWITCHING APPARATUS AND METHOD FOR OPTICAL NETWORK

[75] Inventors: Tatsuya Shiragaki; Takahiro Shiozawa; Syuji Suzuki; Masahiko Fujiwara, all of Tokyo, Japan

[73] Assignee: NEC Corporation, Tokyo, Japan

[21] Appl. No.: 228,896

[22] Filed: Apr. 18, 1994

[30] Foreign Application Priority Data

Apr. 16, 1993 [JP] Japan .................................. 5-089014
Jun. 23, 1993 [JP] Japan .................................. 5-152042

[51] Int. Cl.$^6$ ................................................. H04J 14/00
[52] U.S. Cl. ......................................................... 359/117
[58] Field of Search ........................... 359/117–118, 128, 359/139, 140, 147, 157, 173, 187–188, 110, 116; 385/16, 24; 370/16, 60.1; 371/8.2, 34; 340/825.1

[56] References Cited

U.S. PATENT DOCUMENTS

| | | | |
|---|---|---|---|
| 4,477,895 | 10/1984 | Casper et al. ......................... | 370/16 |
| 5,069,521 | 12/1991 | Hardwick ................................ | 385/24 |
| 5,111,323 | 5/1992 | Tanaka et al. ......................... | 359/139 |

FOREIGN PATENT DOCUMENTS

| | | |
|---|---|---|
| 62-81824 | 4/1987 | Japan . |
| 62-245828 | 10/1987 | Japan . |
| 3-80636 | 4/1991 | Japan . |
| 4-56925 | 2/1992 | Japan . |

OTHER PUBLICATIONS

Patent Abstracts of Japan, vol. 16, No. 251 (P-1366), Jun. 8, 1992.
Patent Abstracts of Japan, vol. 11, No. 284 (E-540) (2731), Sep. 12, 1987.
Patent Abstracts of Japan, vol. 12, No. 118 (E-600), Apr. 14, 1988.
C. Burke et al., "128 Line Photonic Switching System Using LiNbO$_3$ Switch Matrices and . . . Wave Amplifiers", *Journal of Lightwave Technology*, vol. 10, No. 5, May 1992, pp. 610–615.

*Primary Examiner*—Leo H. Boudreau
*Assistant Examiner*—Kinfe-Michael Negash
*Attorney, Agent, or Firm*—Sughrue, Mion, Zinn, Macpeak & Seas

[57] ABSTRACT

An apparatus and a method for performing hitless switching between optical transmission lines such as optical fiber circuits are provided. An optical switch or optical switching network having input terminals and output terminals for selecting optical signals inputted to the input terminals to the output terminals with a selection ratio which can be varied continuously is used. An optical signal converter for generating an optical signal of light which does not interfere with another optical signal is attached to the optical switch. Further, a signal loop interconnecting one of the output terminals of the switch and the input of the optical signal converter is provided. When hitless switching between two optical transmission lines is performed, the same information signal is first inputted to the two transmission lines on the transmission side, then the optical signal from the two lines are transmitted to one of the output terminal (aimed output terminal) of the switch and another output terminal connected to the signal loop. The phase difference between the optical signals is detected and adjusted, and the optical switch is controlled so that the optical signal to be selected at the aimed output terminal is varied to the signal passing through the signal loop.

29 Claims, 7 Drawing Sheets

FIG. 1 (PRIOR ART)
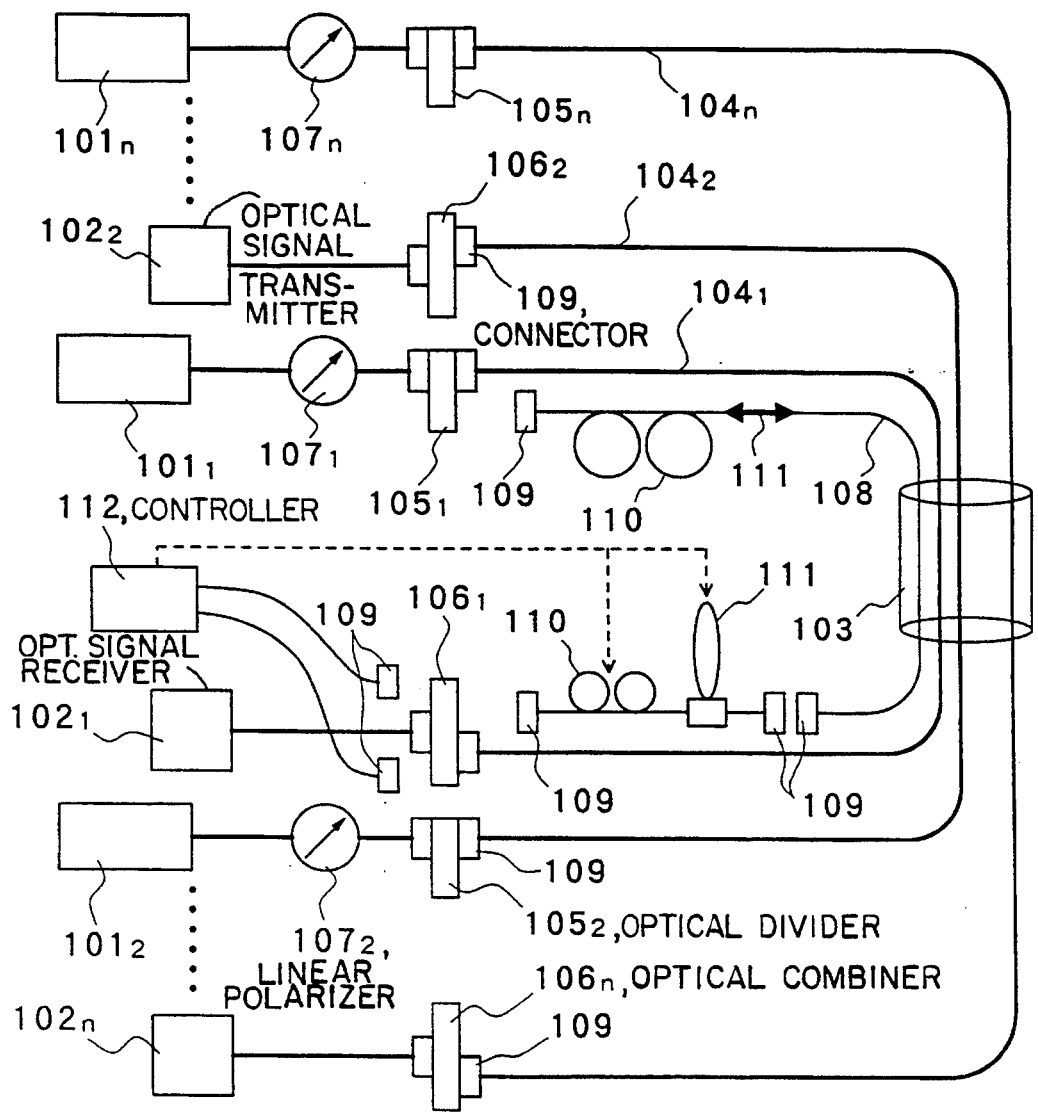
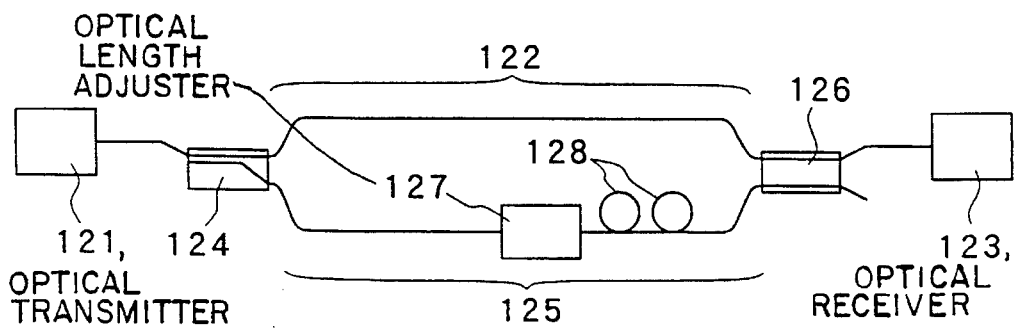
FIG. 2 (PRIOR ART)

HITLESS SWITCHING APPARATUS AND METHOD FOR OPTICAL NETWORK

BACKGROUND OF THE INVENTION

1. Field of the Invention

This invention relates to a hitless switching apparatus and method for optical transmission lines in an optical network.

2. Description of the Related Art

In an optical network which includes a plurality of nodes and optical transmission lines formed from optical fibers or the like for interconnecting the nodes, it is sometimes desired to switch a route along which a signal is transmitted without interrupting transmission of a signal between two nodes. Switching is desired, for example, when it is tried, after the signal transmission route is switched to a bypass route due to the occurrence of trouble in a certain optical transmission line or node, to switch the signal transmission line back to the original route after recovery from the trouble, or when another route must be used to transmit a signal in order to perform construction or maintenance of the equipment. Here, to switch the signal transmission route to a different optical fiber accommodated in the same optical fiber cable is included within switching the signal transmission route to another route. Since switching of an optical transmission generally takes place independently of communication between users in a network, a countermeasure must be taken upon switching to prevent the switching from causing an obstacle to regular communication of the users. In particular, hitless switching must be achieved so that an error of even one bit is not produced. In this instance, since a transmission route before switching and another transmission route after switching generally present different propagation delay amounts, switching that absorbs the difference between the propagation delay amounts must be realized. Since the difference in propagation delay time between the routes is quite large compared with the time per signal bit, mere switching between transmission lines using an optical switch cannot realize hitless switching. Even for switching to a different optical fiber in the same optical fiber cable, since the transmission rate is as high as 1 Gbit/second or more, the phase of the signal cannot be identical between the optical fibers and it is necessary to compensate for the difference in propagation delay time.

A hitless switching system suitable for use with an optical network is disclosed, for example, in Japanese Patent Laid-Open Application No. 80636/91 (JP, A, 3-80636) or No. 56925/92 (JP, A, 4-56925). FIG. 1 shows the construction of the hitless switching system disclosed in the former application. An optical fiber cable 103 accommodates n optical fibers $104_a$ to $104_n$ for signal transmission constituting n/2 pairs of bidirectional transmission lines, and a single spare optical fiber 108. The optical fibers $104_1$ to $104_n$ for signal transmission are removably connected at one end side thereof to output ports of optical dividers $105_1$ to $105_n$ by way of connectors 109, respectively. The input ports of the optical dividers $105_1$ to $105_n$ are connected to optical signal transmitters $101_1$ to $101_n$ by way of linear polarizers $107_1$ to $107_n$, respectively. Meanwhile, the other ends of the optical fibers $104_1$ to $104_n$ are removably connected to the input ports of optical combiners $106_1$ to $106_n$ by way of connectors 109, respectively. The output ports of the optical combiners $106_1$ to $106_n$ are connected to optical signal receivers $102_1$ to $102_n$, respectively. The spare optical fiber 108 has a pair of connectors 109 attached to the opposite ends thereof and has a polarization orthogonal rotator 110 and an optical path length adjuster 111 interposed therein. Each of the connectors 109 can be connected arbitrarily to one of the optical dividers $105_1$ to $105_n$ and one of the optical combiners $106_1$ to $106_n$. Further, an optical path controller 112 which can be connected arbitrarily to two of the optical combiners by way of connectors 109 is provided. The controller 112 measures the polarization directions of and the difference in time between two optical signals inputted to the optical combiners to control the polarization orthogonal rotator 110 and the optical path length adjuster 111.

In order to switch the transmission route from a first optical fiber for signal transmission to a second optical fiber for signal transmission, the spare optical fiber 108 is first connected to the free ports of an optical divider $105_n$ and an optical combiner $106_n$ to which the first optical fiber is connected to set a bypass route by the spare optical fiber 108. Then, the optical divider $105_n$ and the polarization orthogonal rotator 110 are operated so that a signal light beam in the first optical fiber $104_n$ and another signal light beam in the spare optical fiber 108 may be linearly polarized perpendicularly to each other, and the signal light beams are introduced into both of the optical fibers $104_n$ and 108. Thereafter, the optical path length adjuster 111 is adjusted so that the signals passing in the two optical fibers $104_n$ and 108 do not have a difference between arriving times, and then, the optical combiner $106_n$ is switched to the spare optical fiber 108 side to set the signal transmission route to the spare optical fiber $104_n$ 108. Then, the first optical fiber is removed from the optical divider $105_n$ and the optical combiner $106_n$; instead, a second optical fiber is connected to the optical divider $105_n$ and the optical combiner $106_n$. Thereafter, a similar procedure is followed to switch the transmission route for an optical signal from the spare optical fiber 108 to the second optical fiber, thereby realizing hitless switching from the first optical fiber $104_n$ to a second optical fiber.

Separately, FIG. 2 shows the construction of the hitless switching system disclosed in Japanese Patent Laid-Open Application No. 56925/92. The system is constructed so that an optical transmitter 121 and an optical receiver 123 are interconnected by way of a pair of optical fibers 122 and 125 provided in parallel to each other. While the optical fiber 122 has an ordinary construction, the other optical fiber 125 has an optical path length adjuster 127 and a polarization controller 128 interposed therein. An optical switch 124 of the 1×2 construction for inputting signal light at an arbitrary branching ratio into the optical fibers 122 and 125 is provided on the optical transmitter 121 side. An optical coupler 126 for combining signal light inputted thereto from the two optical fibers 122 and 125 is provided on the optical receiver 123 side. Also hitless switching by the system is performed by adjusting the polarization conditions of the two optical fibers 122 and 125 so that they may be orthogonal to each other and by varying the branching ratio of the optical switch 124 while adjusting the propagation time of signal light in the other optical fiber 125 by means of the optical path length adjuster 127.

With the conventional hitless switching systems described above, however, In order to prevent possible interference between signal light beams from two optical transmission lines when the signal light beams are combined, the polarization directions of the two signal light beams to be combined must be adjusted so as to be orthogonal to each other. Accordingly, optical transmission lines by which a polarization condition is maintained must be used; as well, a polarization controller must necessarily be inserted in at least one of the two optical transmission lines. Further, in order to compensate for the propagation delay time, an optical path length adjuster must necessarily be inserted in at least one of the two optical transmission lines. In other words, the conventional hitless switching systems disadvantageous in that a special optical transmission line must be used, which complicates the entire system.

SUMMARY OF THE INVENTION

A first object of the present invention is to provide a hitless switching apparatus which can realize hitless switching between ordinary optical transmission lines.

A second object of the present invention is to provide a node apparatus for an optical network which can realize hitless switching between ordinary optical transmission lines.

A third object of the present invention is to provide a hitless switching method which can realize hitless switching between ordinary optical transmission lines.

The first object of the present invention is achieved by a hitless switching apparatus which is employed in an optical network and which performs hitless switching between a plurality of optical transmission lines, comprising: an optical switch having a plurality of input terminals and a plurality of output terminals for selecting optical signals inputted to the input terminals to switch optical signals to be outputted to the output terminals with a selection ratio which can be varied continuously, phase detection means for detecting phase conditions of optical signals at the output terminals of the optical switch with respect to the same information signal, and optical signal conversion means attached to at least one of the input terminals of the optical switch for inputting to the optical switch an optical signal in the form of light which does not interfere with another optical signal at the output terminals of the optical switch.

The second object of the present invention is achieved by a node apparatus which is employed in an optical network and which is capable of performing hitless switching between a plurality of optical transmission lines, comprising: an optical switching network having a plurality of input terminals and a plurality of output terminals for selecting optical signals inputted to the input terminals to switch optical signals to be outputted to the output terminals with a selection ratio which can be varied continuously; optical receivers connected to some of the output terminals of the optical switching network; a plurality of output optical transmission lines connected to the other output terminals of the optical switching network; an optical transmitter connected to one of the input terminals of the optical switching network; delay means for providing a delay of a variable amount to a signal to be inputted to the optical transmitter; a plurality of input optical transmission lines connected to the other input terminals of the optical switching network; and optical signal conversion means attached to the optical switching network for inputting an optical signal to the optical switching network; wherein a signal based on one of the optical signals having passed the optical switching network is inputted to the optical signal conversion means and the optical signal conversion means generates an optical signal which does not cause interference with another optical signal from another node on the optical receivers.

The second object of the present invention is also achieved by a node apparatus which is employed in an optical network and which is capable of performing hitless switching between a plurality of optical transmission lines, comprising: an optical switching network having a plurality of input terminals and a plurality of output terminals for selecting optical signals inputted to the input terminals to switch optical signals to be outputted to the output terminals with a selection ratio which can be varied continuously; optical receivers connected to some of the output terminals of the optical switching network; a plurality of output optical transmission lines connected to the other output terminals of the optical switching network; an optical transmitter connected to one of the input terminals of the optical switching network; a plurality of input optical transmission lines connected to the other input terminals of the optical switching network; optical delay means provided in the optical switching network for providing an arbitrary delay amount to an optical signal which passes therethrough; and optical signal conversion means attached to the optical switching network for inputting an optical signal to the optical switching network; wherein a signal based on one of the optical signals having passed the optical switching network is inputted to the optical signal conversion means and the optical signal conversion means generates an optical signal which does not cause interference with another optical signal from another node on the optical receivers.

The second object of the present invention is also achieved by anode apparatus which is employed in an optical network and capable of performing hitless switching between a plurality of optical transmission lines, comprising: an optical switching network having a plurality of input terminals and a plurality of output terminals for selecting optical signals inputted to the input terminals to switch optical signals to be outputted to the output terminals with a selection ratio which can be varied continuously; optical receivers connected to some of the output terminals of the optical switching network; a plurality of output optical transmission lines connected to the other output terminals of the optical switching network; an optical transmitter connected to one of the input terminals of the optical switching network; a plurality of input optical transmission lines connected to the other input terminals of the optical switching network; a switching network optical receiver interposed in the optical switching network; and a switching network optical transmitter interposed in the optical switching network; wherein a signal from the switching network optical receiver being inputted to the switching network optical transmitter while the switching network optical transmitter generates an optical signal which does not cause interference with an optical signal from another node on the optical receivers.

The third object of the present invention is achieved by a hitless switching method using a hitless switching apparatus which includes an optical switch having a plurality of input terminals and a plurality of output terminals for selecting optical signals inputted to said input terminals to switch optical signals to be outputted to said output terminals with a selection ratio which can be varied continuously, phase detection means for detecting phase conditions of optical signals at said output terminals of said optical switch with respect to the same information signal, optical signal conversion means attached to at least one of said input terminals of said optical switch for inputting to said optical switch an optical signal in the form of light which does not interfere with another optical signal at said output terminals of said optical switch, a feedback loop from one of said output terminals of said optical switch to said optical signal conversion means, and delay means interposed in said loop for providing a delay of a variable amount to a signal passing said loop in response to a result of detection of said phase detection means; said method comprising the steps of: inputting, with a plurality of optical transmission lines connected individually to said input terminals of said optical switch, the same information signal to two of said optical transmission lines and transmitting an optical signal from one of the two optical transmission lines to an aimed one of said output terminals while another optical signal from the other of the two optical transmission lines is passed through said loop; detecting a phase difference between the optical signals from the two optical transmission lines by means of said phase detection means and controlling said delay means so that the phase when the optical signal from the other optical transmission line arrives at the aimed output terminal is adjusted to coincide with the phase of the optical signal from the one optical transmission line at the aimed output terminal; and gradually switching the optical switch to vary the optical signal to be selected at the aimed output terminal from the optical signal from the one optical transmission line to the optical signal from said optical signal conversion means to effect hitless switching from the one optical transmission line to the other optical transmission line.

The third object of the present invention is also achieved by a hitless switching method for an optical network wherein a transmission side node and a reception side node are interconnected by way of at least three optical transmission lines and wherein: the transmission side node is constructed as a node apparatus which is capable of setting delay times of variable amounts individually for the optical transmission lines and sending out the same information signal; and the reception side node is constructed as a node apparatus which includes an optical switching network having a plurality of input terminals and a plurality of output terminals for selecting optical signals inputted to the input terminals to switch optical signals to be outputted to the output terminals with a selection ratio which can be varied continuously, optical receivers connected to some of the output terminals of the optical switching network, and optical signal conversion means attached to the input terminals of the optical switching network for inputting an optical signal to the optical switching network, a signal from one of the optical receivers being inputted to the optical signal conversion means while the optical signal conversion means generates an optical signal which does not cause interference with another optical signal from another node on the optical receivers, the optical transmission lines using a node apparatus individually connected to the input terminals; the method comprising the step of switching from a first to a second of the optical transmission lines, the switching step comprising the steps of: transmitting, at the transmission side node, the same information as that being transmitted by way of the first optical transmission line into a third of the optical transmission lines and inputting, at the reception side node, a signal from the third optical transmission line to the optical signal conversion means by way of the loop so as to again be inputted to the optical switching network; adjusting, at the transmission side node, the delay amount corresponding to the first or third optical transmission line so that, at an aimed optical receiver in the reception side node which is one of the optical receivers that is receiving an optical signal from the first optical transmission line, the phase of an optical signal from the optical signal conversion means may coincide with the phase of the optical signal from the first optical transmission line; gradually switching the optical switching network so that the aimed optical receiver may receive the optical signal from the optical signal conversion means; also transmitting, at the transmission side node, the same information as that being transmitted by way of the third optical transmission line to the second optical transmission line; adjusting, at the transmission side node, the delay amount corresponding to the second or third optical transmission line so that, at the aimed optical receiver of the reception side node, the phase of the optical signal from the second optical transmission line may coincide with the phase of the optical signal from the optical signal conversion means; and gradually switching the optical switching network so that the aimed optical receiver may receive the optical signal from the second optical transmission line.

The third object of the present invention is also achieved by a hitless switching method for an optical network wherein a transmission side node and a reception side node are interconnected by way of at least two optical transmission lines and wherein: the transmission side node is constructed as a node apparatus which is capable of sending out the same information signal to the optical transmission lines; and the reception side node is constructed as a node apparatus which includes an optical switching network having a plurality of input terminals and a plurality of output terminals for selecting optical signals inputted to the input terminals to switch optical signals to be outputted to the output terminals with a selection ratio which can be varied continuously, the optical switching network being capable of arbitrarily varying the delay times of routes, first and second optical receivers connected to two of the output terminals of the optical switching network, and optical signal conversion means attached to the input terminals of the optical switching network for inputting an optical signal to the optical switching network in response to an output of the second optical receiver, the optical signal conversion means generating an optical signal which does not cause interference with an optical signal from another node on the optical receivers, the optical transmission lines being individually connected to the input terminals; the method comprising the step of switching from a first to a second of the optical transmission lines in a hitless condition while an optical signal from the first optical transmission line is being inputted to the first optical receiver, the switching step comprising the steps of: also transmitting, at the transmission side node, the same information as that being transmitted by way of the first optical transmission line into the second optical transmission line and inputting, at the reception side node, a signal from the second optical transmission line to the second optical receiver; adjusting the delay time amount in the optical switching network so that, at the first optical receiver, the phase of an optical signal from the optical signal conversion means may coincide with the phase of the optical signal from the first optical transmission line; gradually switching the optical switching network so that the first optical receiver may receive the optical signal from the optical signal conversion means; adjusting the delay time amount in the optical switching network so that, at the first optical receiver, the phase of the optical signal from the optical signal conversion means may coincide with the phase of the optical signal from the second optical transmission line; and gradually switching the optical switching network so that the first optical receiver may receive the optical signal from the second optical transmission line.

The above and other objects, features, and advantages of the present invention will become apparent from the following description referring to the accompanying drawings which illustrate examples of preferred embodiments of the present invention.

BRIEF DESCRIPTION OF THE DRAWINGS

FIG. 1 is a block diagram showing an example of conventional hitless switching system;

FIG. 2 is a block diagram showing another example of conventional hitless switching system;

DESCRIPTION OF THE PREFERRED EMBODIMENTS

Preferred embodiments of the present invention are described below with reference to the drawings.

The hitless switching apparatus of the first embodiment of the present invention includes a space dividing type optical switch 200 in the form of an N×N switch matrix (N≧3). The optical switch 200 may be of the waveguide type using, for example, lithium niobate ($LiNbO_3$) and can continuously and complementarily vary the selection ratio between routes of signal light in the optical switch 200 by varying the driving voltage to the optical switch 200 by means or a control section 208. Here, the term "complementarily" is intended to signify that, when input signal light having a fixed intensity is outputted to two output ports and the intensity of the light signal at one output port is increased, the intensity at the other output port is decreased. Naturally, signal light can be outputted to only one of the two output ports.

Figure 3:
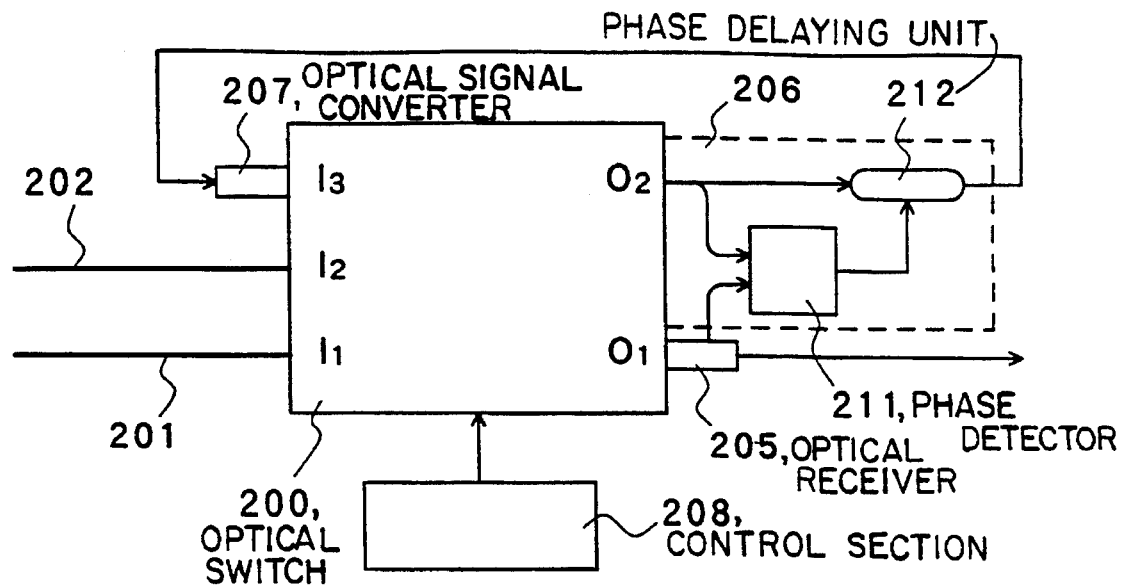
FIG. 3 is a block diagram showing the construction of the hitless switching apparatus of the first embodiment of the present invention.

Referring to FIG. 3, three input ports $I_1$ to $I_3$ from among the N input ports are shown, and two output ports $O_1$ and $O_2$ from among the N output ports are shown. A pair of optical fibers 201 and 202 from the transmission side are connected to the input ports $I_1$ and $I_2$, respectively, and an optical signal converter 207 is attached to the input port $I_3$. Meanwhile, an optical receiver 205 is attached to the output port $O_1$, and a phase synchronizer 206 is attached to the output port $O_2$. The optical fibers 201 and 202 serve as optical transmission lines which make an objective for hitless switching, and the same information signals, which, however, have some difference in tithe or in phase, can be introduced into the optical fibers 201 and 202 on the transmission side.

The optical receiver 205 converts signal light emitted from the output port $O_1$ into an electric signal by opto-electric conversion (O/E conversion) which is output in an electric signal form, and outputs the signal light as is to the phase synchronizer 206. The phase synchronizer 206 is constituted from a phase detector 211 which inputs signal lights outputted from the optical detector 205 and the output port $O_2$ and detects the phase difference as an information signal between the signal lights, and a phase delaying unit 212 which provides a delay of a variable amount to a signal from the output port $O_2$ in response to the result of phase detection by the phase detector 211 and outputs the delayed signal to the optical signal converter 207.

The optical signal converter 207 converts signal light inputted thereto from the phase delaying unit 212 into an optical signal of a low coherence and inputs the optical signal to the optical switch 200 by way of the input port $I_3$. The optical signal converter 207 may employ a semiconductor optical amplifier and produces an optical signal of a low coherence by modulating the spontaneous emission light noise of the optical amplifier by means of an external modulator, for example, an electro-acoustic (EA) modulator or a $LiNbO_3$ modulator.

Next, hitless switching procedure using the above-described apparatus is described. Here, it is assumed that hitless switching is performed from the optical fiber 201 to the optical fiber 202. In this instance, it is assumed that delay times from the input ports $I_1$ to $I_3$ to the output ports $O_1$ to $O_2$ of the optical switch 200 have been measured and are known in advance.

In a steady condition before switching, the optical switch 200 emits signal light inputted thereto from the optical fiber 201 by way of the input port $I_1$ all to the optical detector 205 by way of the output port $O_1$. No light other than the light from the input port $I_1$ is inputted to the optical detector 205. First, at the transmission ends of the optical fibers 201 and 202, the same information signal as that being inputted to the optical fiber 201 is also introduced into the optical fiber 202. In this instance, the optical switch 200 is so adjusted that light inputted thereto from the optical fiber 202 by way of the input port $I_2$ is emitted from the output port $O_2$. As a result of the adjustment, the signal light inputted to the optical switch 200 from the optical fiber 202 is inputted to the optical signal converter 207 by way of the phase synchronizer 206.

In this instance, the phase detector 211 in the phase synchronizer 206 detects the phase difference as an information signal between the signal light beams from the optical fibers 201 and 202 at the output ports $O_1$ and $O_2$. The phase delaying unit 212 is controlled in accordance with the phase difference thus detected, and the variable delay amount is provided to the signal light to be inputted to the optical signal converter 207. Here, a route from the optical signal converter 207 to the optical detector 205 by way of the input port $I_3$ and the output port $O_1$ is supposed, and the delay amount at the phase delaying unit 212 is controlled so that the phase as an information signal of signal light which is to be inputted to the optical receiver 205 by way of the route may be synchronized with the phase as an information signal of signal light which is currently inputted from the optical fiber 201 to the optical receiver 205. Then, the driving voltage to the optical switch 200 is varied by the control section 208 to continuously switch the selection ratio of the reception route of the signal light appearing at the output port $O_1$ continuously from a route from the input port $I_1$ to the output port $O_1$ to another route from the input port $I_3$ on the optical signal converter 207 side to the output port $O_1$. Since light from the optical signal converter 207 is a signal light beam of a low coherence, the signal light from the optical fiber 201 and the signal light from the optical signal converter 207 are mixed without interfering with each other in the process of switching in the optical switch 200. Accordingly, the intensity of light inputted to the optical receiver 205 is given as the sum of the intensities of the signal light from the two routes at the selection ratio between the routes. In this condition, since the phases in intensity modulation of the signal light beams from the two routes are synchronous with each other, the receiver 205 is receiving regularly at any instant during switching. When it is taken into consideration that the signal light from the optical signal converter 207 originates from signal light from the optical fiber 202, hitless switching from the optical fiber 201 to the optical fiber 202 has been realized.

Further, if a delay amount is set, at the transmission end, for signal light to be inputted to the optical fiber 201 and then the delay amount of the phase delaying unit 212 is gradually decreased finally to zero, then by executing a similar procedure to that described above, the optical receiver 205 changes in a hitless condition from a condition wherein it receives a light signal inputted thereto from the optical signal converter 207 by way of the optical switch 200 to another condition wherein it receives another signal inputted thereto from the optical fiber 202 only by way of the optical switch 200. In the condition after the change, the optical signal converter 207 does not contribute to transmission of an optical signal. Since electro-optic conversion generally takes place at the transmission ends of the optical fibers 201 and 202, it is possible to provide a suitable delay amount on the transmission end side by passing an electric signal before electro-optical conversion at the transmission end, for example, through an elastic buffer memory.

While, in the foregoing description, the optical signal converter 207 employed is constructed so that it modulates a spontaneous emission light noise of a semiconductor optical amplifier by means of an external modulator, the present embodiment is not limited to this. It is also possible to employ a construction wherein output light of a light emitting diode (LED), an SLD (super-luminescence diode), or a Fabry-Perot type semiconductor laser is modulated by means of an external modulator or another construction wherein a Fabry-Perot semiconductor laser is modulated directly. Further, while description of hitless switching of a spatially divided network is given above, hitless switching of a wavelength divided multiplex network can be performed similarly by spatial development using a wavelength divided multiplexer and a wavelength divided demultiplexer.

Further, an optical signal converter which generates signal light having a wavelength different from that of signal light inputted to the optical switch 200 from the optical fibers 201 and 202 can be used for the optical signal converter 207. In this instance, light from the optical signal converter 207 need not have a low coherence. In particular, when the frequency of a beat component produced from the difference between the frequency of light from the optical fibers 201 and 202 and the frequency of light from the optical signal converter 207 is higher than the follow-up frequency of the optical receiver 205, even if the light beams thereof interfere with each other, there is no influence of the interference on the optical receiver 205, and consequently, hitless switching can be achieved. One optical signal converter of the type just mentioned is constructed so that an optical receiver and an optical transmitter are coupled directly to each other so that an electric signal into which an optical signal inputted from the phase delaying unit 212 has been converted once is converted back into light by means of the optical transmitter. It is otherwise possible to construct the optical signal converter of the type wherein waveform conversion of light is performed using for example, an optical wave mixture or the like.

As a concrete example, for example, the case wherein an optical receiver which can receive data at a data rate up to 2.4 Gb/s is employed in an optical network system which uses light of the wavelength band of 1.31 µm is considered. If an optical signal converter which sends out light having a wavelength displaced by 1 nm from that of light used in the system is used, the frequency of the beat signal of combined light on the optical receiver side is several hundreds GHz, and consequently, the influence of the beat signal, that is, the influence of interference, does not have an influence upon the optical receiver 205.

Figure 4:
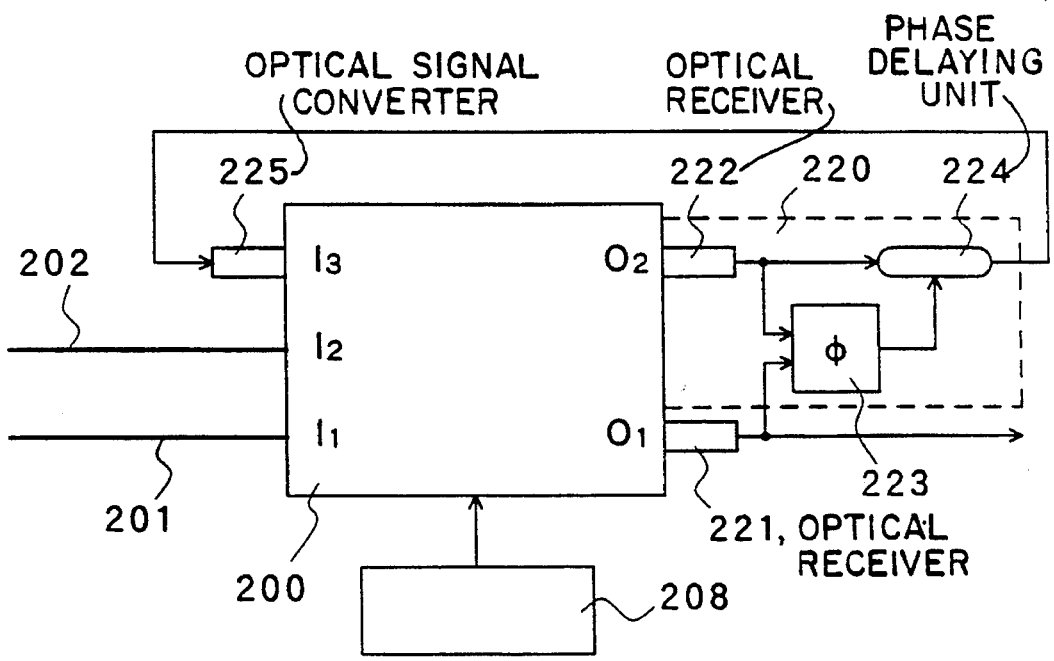
FIG. 4 is a block diagram showing the construction of the hitless switching apparatus off the second embodiment of the present invention.

Next, a second embodiment of the present invention is described with reference to FIG. 4. While, in the first embodiment described above, signal light is inputted to the optical signal converter 207, in the present second embodiment, an electric signal obtained by conversion from signal light is inputted to an optical signal converter. In FIG. 4, the same reference numerals as those of FIG. 3 denote the same functional blocks.

A pair of optical receivers 221 and 222 are attached to output ports $O_1$ and $O_2$, respectively, of an optical switch 200. The optical receiver 221 converts signal light inputted thereto by way of the output port $O_1$ into and outputs an electric signal to the outside and outputs the electric signal also to a phase comparator 223 which will be hereinafter described. The other optical receiver 222 converts signal light inputted thereto by way of the output port $O_2$ into an electric signal and outputs it to the phase comparator 223 and a phase delaying unit 224. The phase comparator 223 detects the phase difference as an information signal between electric signals from the optical receivers 221 and 222. The phase delaying unit 224 provides a delay of a variable amount to an electric signal from the optical receiver 222 in accordance with the phase difference detected by the phase comparator 223. The phase delaying unit 224 may be constituted from, for example, an elastic buffer memory. Here, the elastic buffer memory stores signals inputted thereto with time differences and outputs the signals in order of arrival thereat, and the write timing and the read timing of the elastic buffer memory can be set independently of each other. Thus, the elastic buffer can be realized as a kind of FIFO (First In First Out) memory or dual port memory. Further, the elastic buffer memory can also be constituted using a surface wave device or a like device. The other optical receiver 222, the phase comparator 223 and the phase delaying unit 224 constitute a phase synthesizer 220.

The optical signal converter 225 is constituted from an optical transmitter which converts an electric signal from the phase delaying unit 224 into an optical signal. Signal light from the optical signal converter 225 is light having a low coherence or having a wavelength displaced from the wavelength of light inputted from an optical fiber, as in the first embodiment. In particular, the optical signal converter 225 may be constructed so that output light of a light emitting diode, an SLD (super luminescence diode), of a Fabry-Perot type semiconductor layer is modulated in accordance with an electric signal inputted thereto using an external modulator.

Figure 5:
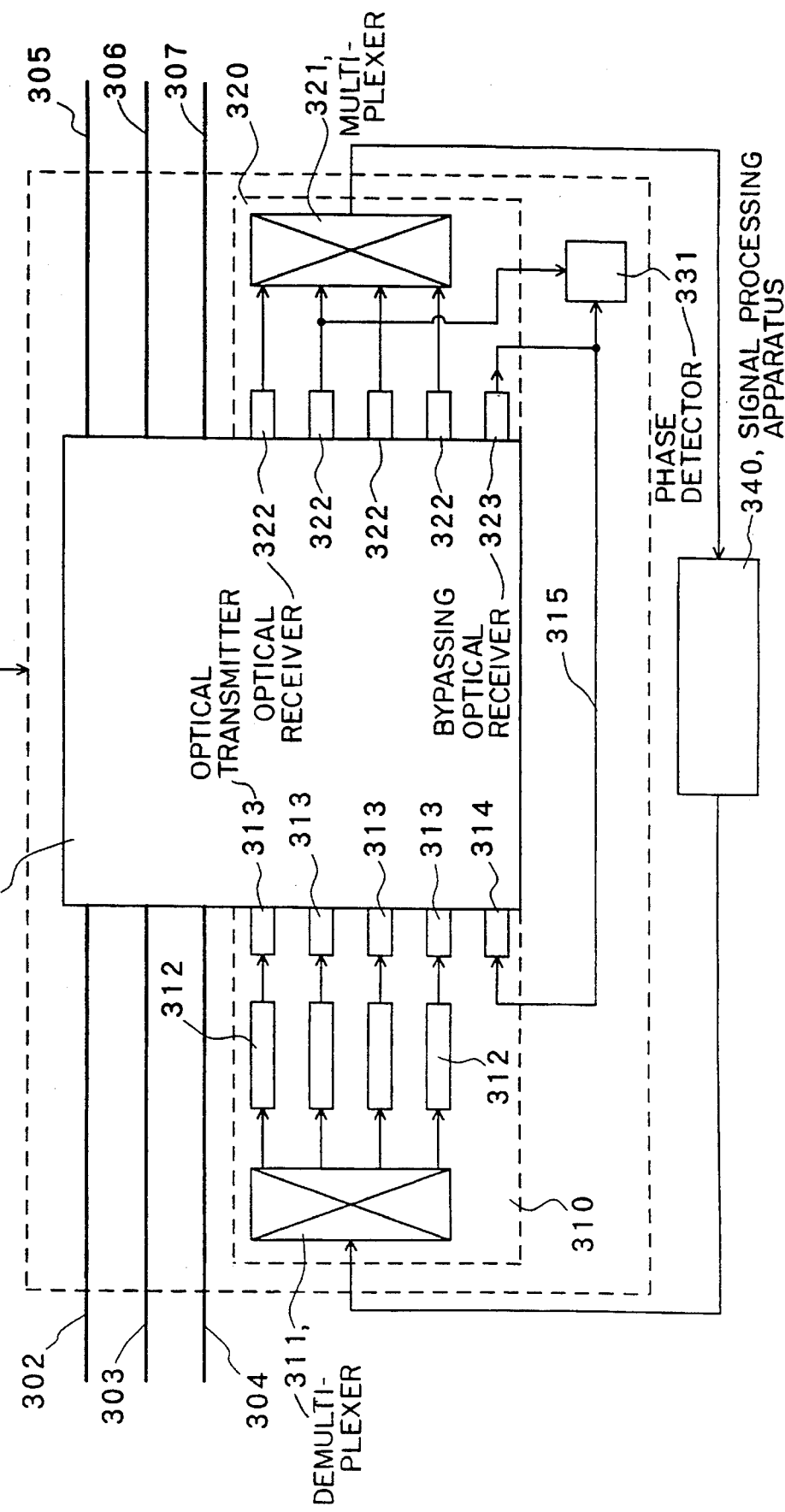
FIG. 5 is a block diagram showing the construction of the hitless switching apparatus of the third embodiment of the present invention.

Next, a third embodiment of the present invention is described. FIG. 5 shows the construction of the hitless switching apparatus in the present embodiment which is used as a node apparatus in an optical network.

A spatial if divided type optical circuit switching network 301 of the N×N construction is provided, and optical fibers 302 to 304 serving as optical transmission lines and an OLTM (Optical Line Terminator and Multiplexer) 310 are connected to the input side of the optical switching network 301. Optical fibers 305 to 307 and an OLTM 320 are connected to the output side of the optical switching network 301. The other ends of the optical fibers 302 to 304 are connected to a transmission side node relative to the present node apparatus, and the other ends of the optical fibers 305 to 307 are connected to a reception side node relative to the present node apparatus.

The OLTM 320 provided on the output side of the optical circuit switching network 301 includes a plurality of optical receivers 322 each for converting an input optical signal into an electric signal, and a multiplexer 321 for time-division multiplexing electric signals from the optical receivers 322 and outputting the resulting signal. The optical receivers 322 are attached individually to the output ports of the optical switching network 301 to which the optical fibers 305 to 307 are not connected. Further, a bypassing optical receiver 323 which is not connected to the multiplexer 321 is provided for the OLTM 320. The bypassing optical receiver 323 is attached to one of the outputs of the optical switching network 301 to which none of the optical fibers 305 to 307 and the optical receiver 322 is connected. An electric signal from the bypassing optical receiver 323 is outputted directly to the outside of the OLTM 320. Either of the optical receivers 322 and 323 can be constituted from an opto-electric converter which employs an APD (avalanche photo diode).

A signal processing apparatus 340 to which an output of the multiplexer 321 of the OLTM 320 is inputted is provided. The signal processing apparatus 340 performs signal processing as a node of the optical network and is provided to accept data to be transmitted from the node to another node or to extract data transmitted to the node from another node. For example, the signal processing apparatus 340 may be constituted from a digital crossconnect system (DCS) or an add drop multiplexer.

A demultiplexer 311, an elastic buffer memory 312 provided at each of output terminals of the demultiplexer 311, and optical transmitters 313 of the ordinary type are provided for the OLTM 310 provided on the input side of the optical circuit switching network 301. Each of the optical transmitters 313 is connected to the output terminal of each of the elastic buffer memories 312. The demultiplexer 311 distributes a time-division multiplexed electric signal inputted thereto from the signal processing apparatus 340 to the individual ordinary type optical transmitters 313. Each of the elastic buffer memories 312 is a memory for which a read clock signal and a write clock signal can be set independently of each other similar to that described hereinabove in connection with the first embodiment, and is provided to provide a variable delay amount to an electric signal passing therethrough. The ordinary type optical transmitters 313 are attached individually to the input ports of the optical switching network 301 to which none of the optical fibers 302 to 304 are connected. The ordinary type optical transmitters 313 have a common construction for inputting signal light to the optical switching network and each are realized as an electro-optical converter which employs, for example, a DFB (distributed feedback) semiconductor laser.

Further, a bypassing optical transmitter 314 of a different type from that of the ordinary type optical transmitter 313 is provided for the OLTM 310. The optical transmitter 314 directly receives an electric signal from the bypassing optical receiver 323 of the OLTM 320 on the output side. The route of an electric signal interconnecting the bypassing optical receiver 323 and the optical transmitter 314 is hereinafter referred to as loop 315. The bypassing optical transmitter 314 is attached to one of the input ports of the optical switching network 301 to which none of the optical fibers 302 to 304 and the ordinary type optical transmitters 313 is attached. The bypassing optical transmitter 314 employs a light source having a coherence so low that it does not cause interference with another optical signal. For example, an optical transmitter of the construction which directly modulates a semiconductor laser of the Fabry-Peter type or which modulates light from an SLD (super luminescence diode) by means of an external modulator is used for the optical transmitter 314. Further, a light source of a wavelength different from the wavelengths of light inputted from the optical fibers 302 to 304 or of light produced from the ordinary type optical transmitter 313 can be used for the bypassing optical transmitter 314. In this instance, when the frequency of a beat signal produced from the difference between frequencies of light from the bypassing optical transmitter 314 and any other optical signal is higher than the follow-up frequency of the optical receivers 322, a light source having a high coherence can be used for the bypassing optical transmitter 314.

The present apparatus further includes a control section 330 for controlling the optical switching network 301 and the OLTMs 310 and 320, and a phase detector 331 for detecting the phase difference between optical signals. The please detector 331 can be removably connected between the outputs of an arbitrary two of the optical receivers 322 and the bypassing optical receiver 323, and detects, when optical signals corresponding to the same information data are inputted to the two optical receivers, the phase difference as an information signal between the optical signals inputted thereto. In particular, in observing particular flags or data patterns in the information signal, a difference between arriving times of the flags or the data patterns is detected.

The optical circuit switching network 301 is described below. The optical switching network 301 is constructed from a combination of a plurality of optical switches. Here, each of the optical switches can continuously and complementarily vary the selection ratio between routes of signal light in the inside of the optical switch by varying the driving voltage to be applied to the optical switch by means of the control section 330.

Figure 6:
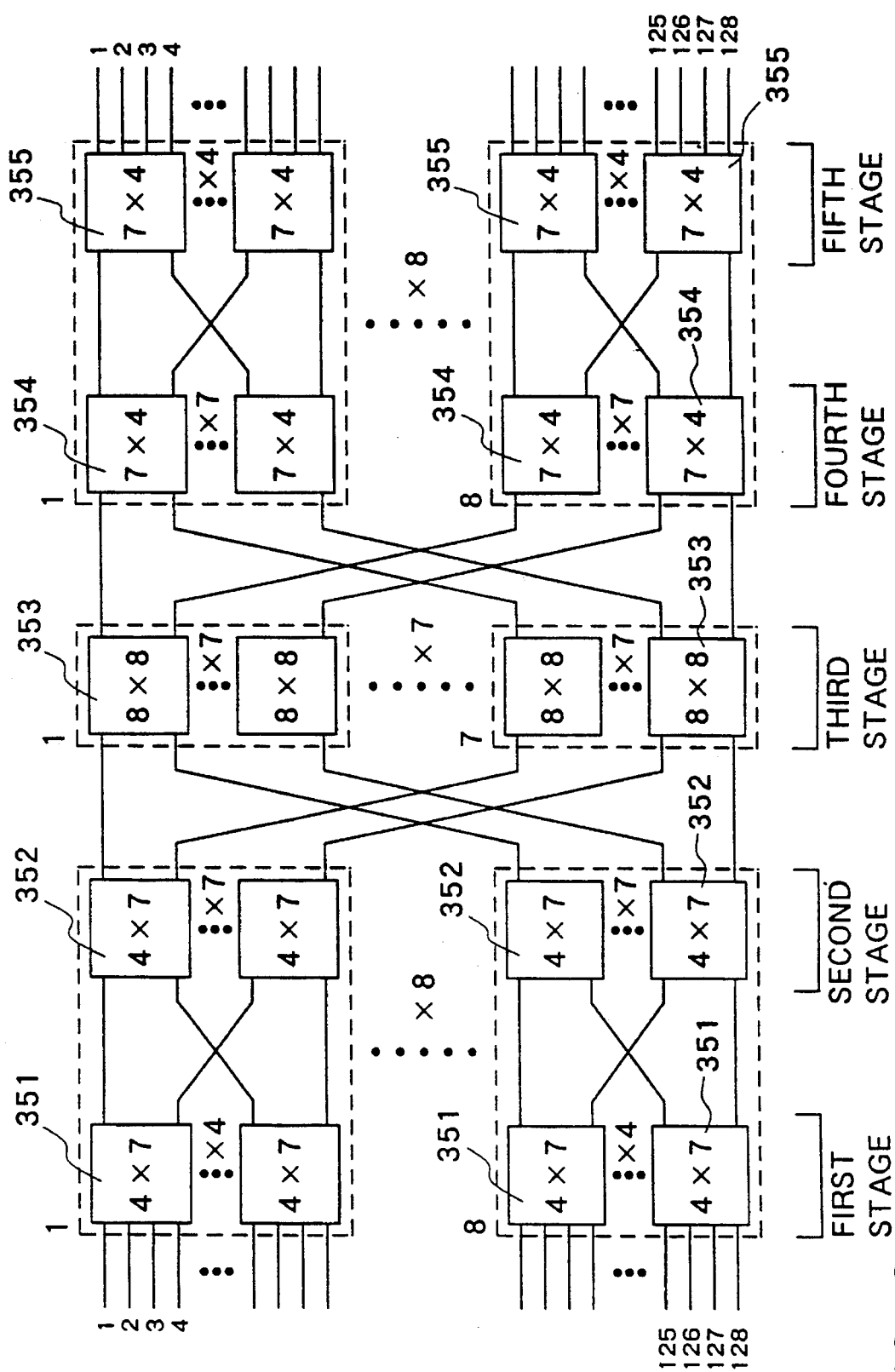
FIG. 6 is a block diagram showing the construction of the optical circuit switching network used in the hitless apparatus.

FIG. 6 shows the internal construction of the optical circuit switching network 301. The optical switching network 301 is similar to the optical switching network disclosed in C. Burke et al., IEEE J. of Lightwave Technology, 10, 610 (1992), and is constructed so that matrix optical switches each constituted from, for example, a LiNbO$_3$ (lithium niobate) waveguide are connected in a cascade connection at five stages each of which has a link connection. The link connection signifies that all matrix switches at each stage are connected to matrix switches of each adjacent one of the stages. Here, the optical switching network 301 has a 128×128 input/output construction wherein the first stage, that is, the input stage, is constituted from thirty-two 4×7 matrix switches 351; the second stage is constituted from fifty-six 4×7 matrix switches 352; the third stage is constituted from forty-nine 8×8 matrix switches 353; the fourth stage is constituted from fifty-six 7×4 matrix switches 354; and the fifth stage, that is, the output stage, is constituted from thirty-two 7×4 matrix switches 355.

Where the optical switching network 301 is constructed in this manner, an optical signal to be inputted from any of the optical fibers 302 to 305 and the optical transmitters 313 and 314 to the optical switching network 301 can be outputted arbitrarily at an arbitrary selection ratio to the optical fibers 305 to 307 and the optical receivers 322 and 323 by controlling the optical switching network 301 by means of the control section 330. It is also possible to distribute an optical signal from the same input port simultaneously to different output ports at an arbitrary selection ratio or to combine optical signals from different input ports at an arbitrary selection ratio at the same output port. In particular, it is possible to set the route or vary the connection condition arbitrarily in the optical switching network 301.

Figure 7:
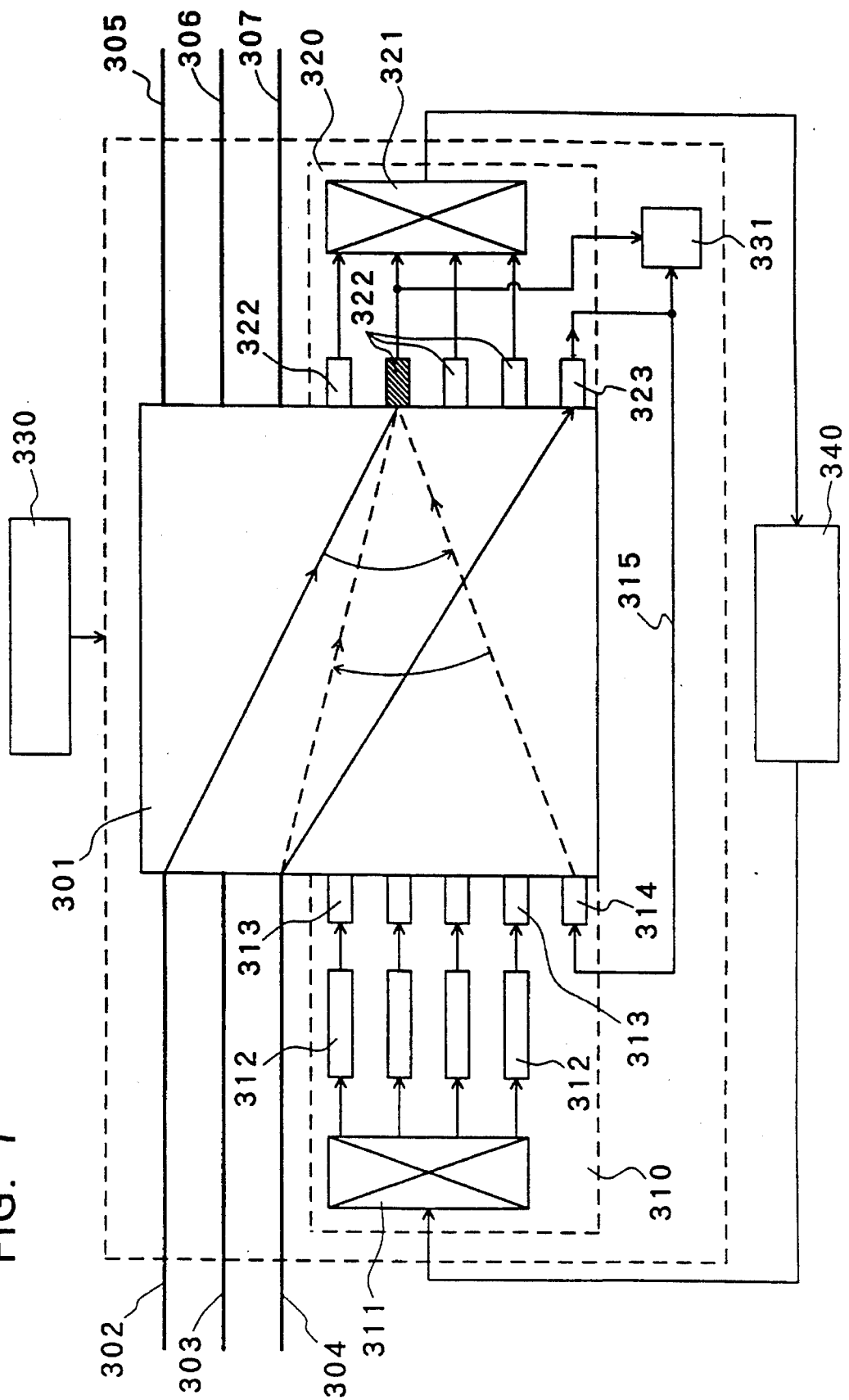
FIG. 7 is a block diagram illustrating the hitless switching operation of the third embodiment.

A hitless switching procedure using the present hitless switching apparatus is described below with reference to FIG. 7. Here, it is assumed that an apparatus similar to that described above is used as a node on the transmission side and that the node on the transmission side and the present apparatus are connected to each other by way of the optical fibers 302 to 304. Description is given of the case wherein the transmission route of an optical signal is switched from the first optical fiber 302 to the second optical fiber 303. It is also assumed that the delay time amount of each of the routes in the optical circuit switching network 301 has been calculated and is known in advance.

In order to switch the optical signal transmission route from the optical fiber 302 to the optical fiber 303 in a hitless condition, the optical signal transmission route is switched from the first optical fiber 302 once to the third optical fiber 304 and then switched from the third optical fiber 304 to the second optical fiber 303. Initially, signal light from the first optical fiber 302 is inputted to one of the optical receivers 322 which is indicated by slanting lines in FIG. 7 by way of the optical switching network 301. The optical receiver 322 indicated by slanting lines is hereinafter referred to as an aimed optical receiver.

First, the node on the transmission side is operated so that the same optical signal is sent out to both of the first optical fiber 302 and the third optical fiber 304. The optical switching network 301 is switched so that signal light from the third optical fiber 304 is inputted to the bypassing optical receiver 323. As a result, the bypassing optical transmitter 314 introduces the optical signal into the optical switching network 301 in response to an electric signal inputted thereto from the bypassing optical receiver 323 by way of the loop 315. In this instance, the phase detector 331 detects the arriving time difference of the optical signal between the aimed optical receiver 322 and the bypassing optical receiver 323.

Then, in the node on the transmission side, the delay time amounts of the optical signals emitted to the first and third optical fibers 302 and 304 are adjusted in response to the output of the phase detector 331 of the present node so that the phase of time light signal inputted directly from the first optical fiber 302 and the phase of the light signal from the bypassing optical transmitter 314 may be synchronized with each other at the aimed optical receiver 322. Here, it is assumed for the latter phase that the optical switching network 301 is controlled and that output signal light from the bypassing optical transmitter 314 arrives at the aimed optical receiver 322. Since an apparatus similar to the apparatus shown in FIG. 5 is provided in the node on the transmission side, the delay time amounts can be varied by adjusting the elastic buffer memories of the apparatus. Then, once the synchronization between the phases described above is established, the optical switching network 301 is switched gradually so that signal light from the bypassing optical transmitter 314 may be introduced into the aimed optical receiver 322. Since the signal light frown the bypassing optical transmitter 314 and the signal light from the first optical fiber 302 do not interfere with each other at the aimed optical receiver 322, hitless switching from the first optical fiber 302 to the third optical fiber 304 is realized similarly as in the first embodiment described hereinabove.

At the point of time when switching to the third optical fiber 304 is realized, the optical signal having passed through the loop 315 and converted by the bypassing optical transmitter 314 is inputted to the aimed optical receiver 322. Next, the node on the transmission side is operated so that the same information signal may also be introduced into the second optical fiber 303. The delay time amounts are adjusted in the node on the transmission side based on the output of the phase detector 331 of the present node so that the phase of the light from the second optical fiber 303 when the light is introduced directly into the aimed optical receiver 322 without passing through the loop 315 and the phase of the signal light being received from the bypassing optical transmitter 314 by the aimed optical receiver 322 may coincide with each other. After the synchronization of the phases is confirmed, the optical switching network 301 is switched gradually so that the source of the light introduced into the aimed optical receiver 322 may change from the bypassing optical transmitter 314 to the optical fiber 302. Consequently, hitless switching from the optical fiber 304 to the optical fiber 303 is realized. As a result, hitless switching from the first optical fiber 302 to the second optical fiber 303 is accomplished.

In the present embodiment, a difference in phase arising from opto-electric conversion or like conversion at the bypassing optical transmitter 314 connected to the loop 315 or the optical receiver 323 is present between the route along which an optical signal from the second optical fiber 303 is received by an optical receiver 322 without passing the loop 315 and the route along which the signal is also received by the same optical receiver 322 passing the loop 315. Therefore, direct hitless switching cannot be performed between the two routes from the second optical fiber 303. Accordingly, in the present embodiment, the optical signal transmission route is first switched in a hitless condition to the third optical fiber 304 and then a delay amount corresponding to the phase difference described above is provided to the optical signal to be inputted to the second optical fiber 303, whereafter the optical signal transmission route is switched to the object optical fiber, i.e. the second optical fiber 303, in a hitless condition.

In other words, in the present embodiment, a loop for interconnecting the input and output terminals of the optical switching network is provided, and hitless switching is realized by making use of the loop. When it is intended to switch the optical signal transmission route from a first reception route to a second reception route in a hitless condition, the optical signal transmission route is switched from the first reception route once to a third reception route in a hitless condition and then switched to the second reception route in a hitless condition. If it is tried to switch the optical signal transmission route otherwise from the first reception route to the second reception route without being switched to the third reception route, it is necessary to switch the optical signal transmission route to a reception route, which is constructed so as to interconnect the input and output terminals of the optical switching network and to pass a loop which includes an opto-electric converter, a delay adjuster and an opto-electric converter, in a hitless condition and then switch the optical signal transmission route to another reception route which does not pass the loop. However, since the reception route which passes the loop involves a delay arising from the length of the route of the loop and from electro-optical conversion and opto-electric conversion compared with the other reception route which passes the same transmission line but does not pass the loop, a signal having passed the reception route which passes the loop cannot be returned directly to the reception route which does not pass the loop. However, if the optical signal transmission route is switched once to the third reception route in a hitless condition and then a delay by the loop is set to the second reception route, whereafter the optical signal transmission route is switched in a hitless condition to the second reception route after the setting, the optical signal transmission route can be returned in a hitless condition to the reception route which does not pass the loop. Accordingly, hitless switching between ordinary optical transmission lines in which a polarization controller or a like element is not interposed can be achieved. Further, since an optical circuit switching network whose connection condition can be varied arbitrarily by varying the driving voltage is employed, optical transmission lines which make objects for hitless switching can be selected with a high degree of freedom.

Figure 8:
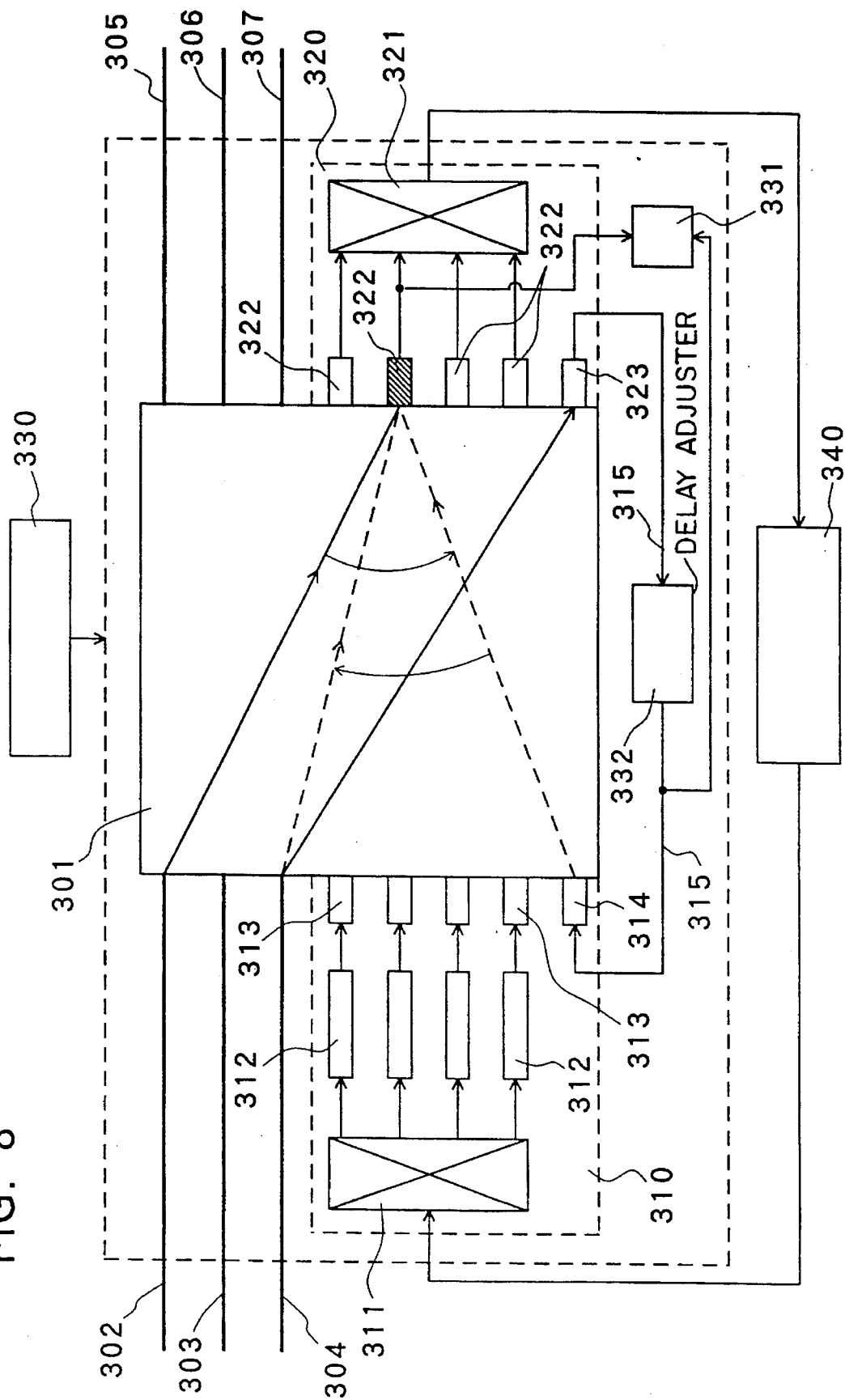
FIG. 8 is a block diagram showing the construction of the hitless switching apparatus of the fourth embodiment of the present invention.

Next, a fourth embodiment of the present invention is described with reference to FIG. 8. In FIG. 8, elements to which the same reference numerals as those of FIG. 5 are applied have functions similar to those of the elements shown in FIG. 5.

While the apparatus shown is also used as a node apparatus in an optical network, the apparatus is different from the apparatus of the third embodiment in that a delay adjuster 332 is interposed in the loop 315 interconnecting the bypassing optical receiver 323 and the bypassing optical transmitter 314. When it is tried to detect, using the phase detector 331, the phase difference as an information signal between an optical signal inputted to the bypassing optical receiver 323 and another optical signal inputted to an optical receiver 322, one of the inputs of the phase detector 331 is connected to the output side of the delay adjuster 332 while the other input is connected to the output of the ordinary type optical receiver 322. The delay adjuster 332 may be constituted from an elastic buffer memory which allows reading and writing synchronized with clock signals and allows independent variation of the read clock signal and the write clock signal. By suitably adjusting the read and write clock signals, a variable delay amount can be provided to an electric signal to be transmitted from the bypassing optical receiver 323 to the bypassing optical transmitter 314 by way of the loop 315.

Next, a hitless switching procedure using the node apparatus according to the present embodiment is described. The other ends of the optical fibers 301 to 304 are connected to a node on the transmission side, and the node on the transmission side is also constituted from an apparatus (which need not be a delay adjuster) equivalent to the apparatus described above. While, in the third embodiment described hereinabove, adjustment in phase, that is, setting of a delay amount, for an optical signal to be transmitted by way of each of the optical fibers 302 to 304 is performed on the transmission side node, in the present embodiment, rough adjustment is performed in the node on the transmission side while fine adjustment is performed in the node on the reception side, that is, the node shown in FIG. 8. Fine adjustment is performed by adjusting the delay amount by the delay adjuster 332.

In the case of the third embodiment, communication for phase adjustment must be performed frequently between the reception side node and the transmission side node using a network management system of a like system. However, in the fourth embodiment, since fine adjustment against the phase difference is performed in the reception side node, the amount of communication performed by way of the network management system is reduced and the time required for hitless switching can also be reduced compared with the third embodiment. While it is possible to employ another construction wherein fine adjustment is performed in the transmission side node and rough adjustment is performed in the reception side node, since hitless switching is performed by establishing synchronization in phase as an information signal between optical signals from two routes in the reception side node, it is more practical to perform fine adjustment in the reception side node and hitless switching can be performed with a higher degree of accuracy.

While, in the third and fourth embodiments described above, means for providing a delay of a variable amount such as the elastic buffer memories 312 or the delay adjuster 332 is provided on the outside of the optical circuit switching network 301, the present invention is not limited to this. Means for providing a delay of a variable amount can be provided on the inside of the optical switching network. In particular, the optical switching network including the five-state cascade connection shown in FIG. 6 can be constructed so that optical delaying units are interposed between each adjacent stage. Each of the optical delaying units may be constructed in such a manner that an optical waveguide in the optical switching network is partially cut so that an optical signal may propagate in the space between the cut portions of the optical waveguide to delay the optical signal and the distance for the spatial propagation is varied to vary the delay amount. Where the optical delaying units are provided on the inside of the optical switching network in this manner, there is no necessity to perform communication between the transmission side node and the reception side node in order to perform phase adjustment, and compared with an alternative arrangement wherein delaying means is provided on the outside of the optical switching network, both the load to the network management system is reduced and the time required for hitless switching is reduced.

In this instance, instead of interposing the optical delaying units into the optical switching network, another construction wherein opto-electric conversion is performed in the optical switching network and an electric signal obtained by the conversion is inputted to an elastic buffer memory wherein an output signal of the elastic buffer memory is converted into an optical signal by electro-optical conversion may be employed.

Figure 9:
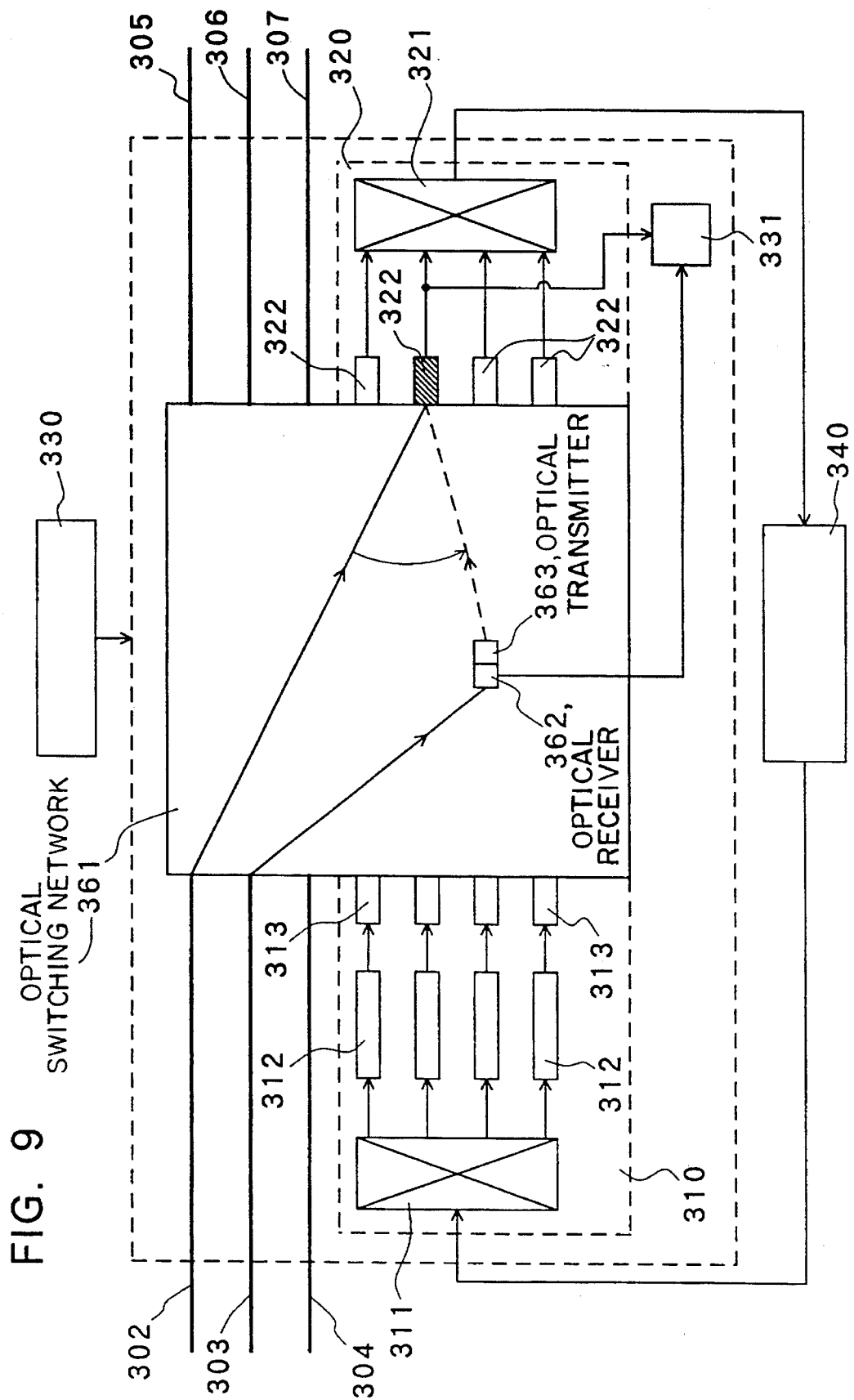
FIG. 9 is a block diagram showing the construction of the hitless switching apparatus of the fifth embodiment of the present invention.

A fifth embodiment of the present invention is described below with reference to FIG. 9. In FIG. 9, elements denoted by the same reference numerals as those shown in FIG. 5 have the same functions as those of the elements shown in FIG. 5. While, in the third and fourth embodiments, a loop interconnecting a bypassing optical receiver and a bypassing optical transmitter is formed outside the optical switching network, in the present embodiment, a bypassing optical receiver and a bypassing optical transmitter are inserted in the inside of the optical switching network.

For an optical switching network 361, an optical switching network wherein optical matrix switches are connected in a cascade connection at five stages similar to that shown in FIG. 6 is used. In the optical switching network 361, an input terminal of an optical receiver 362 is connected to an output terminal of a matrix switch at the second stage, and an output terminal of an optical transmitter 363 is connected to an input terminal of a matrix switch at the third stage. In reality, a waveguide interconnecting matrix switches at the second and third stages is suitably cut, and the optical receiver 362 and the optical transmitter 363 are inserted in pair between the cut portions of the waveguide. The output terminal of the optical receiver 362 and the input terminal of the optical transmitter 363 are electrically connected directly to each other. An optical transmitter similar to the bypassing optical transmitters described hereinabove is used for the optical transmitter 363. The optical receiver 362 can be connected to the phase comparator 331.

By the construction described above, the matrix switches at the first and second stages of the optical switching network 361 can select a route when an optical signal is to be inputted to the optical receiver 362. In short, the matrix switches at the first and second stages select an optical fiber for an object for which hitless switching is performed. Meanwhile, the matrix switches at the third to fifth stages play a role similar to that of the optical switching network for an optical signal which has passed the loop and is introduced into the optical switching network again from the bypassing optical transmitter in any of the embodiments described above. In particular, the matrix switches at the third to fifth stages are used to gradually switch the route between two optical signals which do not interfere with each other. While, in the first to fourth embodiments described above, signal light inputted from the node on the transmission side by way of an optical fiber passes the optical switch or the optical switching network twice by way of the loop provided outside the optical switching network, in the present embodiment, hitless switching can be achieved without provision of a loop outside the optical switching network.

In this manner, in the present embodiment, since the route along which an electric signal obtained by conversion by the optical receiver 362 is transmitted to the optical transmitter 363 is constructed on the inside of the optical switching network 361 and the optical switching network 361 used is constructed so as to change the connection condition thereof freely, even when a polarization adjuster or a like element is not interposed in the optical transmission line, hitless switching can be performed, and a optical transmission lines which make objects for hitless switching can be selected with a high degree of freedom. Further, while the route along which an electric signal is transmitted frown the optical receiver 362 to the optical transmitter 363 involves a delay arising from opto-electric conversion or some other cause, phase adjustment against the delay can be performed only on the reception side node. Since there is no necessity of delay adjustment on the transmission side node, hitless switching from a first optical fiber to a second optical fiber can be performed without switching the route to a third optical fiber once. In particular, an optical delaying unit may be provided on the inside of the optical switching network or delay adjustment may be performed using the elastic buffer memories 312.

While the present invention is described in detail above in connection with the embodiments, the present invention is not limited to the embodiments described above. For example, it is possible to use an optical delaying unit as the delay adjuster provided outside the optical switching network, and an optical delaying unit may be used also in place of an elastic buffer memory for an electric signal. In this instance, the optical delaying unit is interposed between the optical transmitter and the optical switching network.

Meanwhile, the bypassing optical transmitter or the optical transmitter which is provided on the inside of the optical switching network may be constituted from an optical transmitter which generates low coherent light or which generates light of such a wavelength that the frequency of a beat signal when combined with different light is higher than the follow-up frequency of the optical receiver. Further, where the different light is linearly polarized light, an optical transmitter with a polarization direction which is orthogonal to the different light can be used for the bypassing optical transmitter or the optical transmitter provided on the inside of the optical switching network.

While an optical switching network which includes matrix optical switches connected in a cascade connection at five stages is employed in the third to fifth embodiments, it is otherwise possible to employ another optical switching network of another construction. Further, the matrix switches are not limited to LiNbO$_3$ matrix switches, but it is possible to construct the optical switching network using optical switches of any other type which may use of an electro-optical effect, an acousto-optical effect, or some other effect. While the OLTM in the third to fifth embodiments includes an optical receiver and an optical transmitter, it is also possible to employ another construction wherein the optical receiver and the optical transmitter are arranged outside the OLTM. While an electric signal between the OLTM on the output side and the OLTM on the input side is a time multiplexed electric signal and a digital crossconnect system or an add drop multiplexer is inserted as a signal processing apparatus, the present invention can be applied to another construction wherein a non-time multiplexed system is used and directly connected to arm object for communication such as a computer.

It is to be understood that variations and modifications of a hitless switching apparatus and method for optical network disclosed herein will be evident to those who skilled in the art. It is intended that all such modifications and variations be included within the scope of the appended claims.

What is claimed is:

1. A hitless switching apparatus which is employed in an optical network and which performs hitless switching between a plurality of optical transmission lines, comprising:

an optical switch having a plurality of input terminals and a plurality of output terminals for selecting optical signals inputted to said input terminals to switch optical signals to be outputted to said output terminals with a selection ratio which can be varied continuously;

phase detection means coupled to said output terminals through at least one optical receiver for detecting phase conditions of optical signals at said output terminals of said optical switch with respect to the same information signal; and optical signal conversion means attached to at least one of said input terminals of said optical switch for inputting to said optical switch an optical signal in the form of light which does not interfere with another optical signal at said output terminals of said optical switch.

2. A hitless switching apparatus which is employed in an optical network and which performs hitless switching between a plurality of optical transmission lines, comprising:

an optical switch having a plurality of input terminals and a plurality of output terminals for selecting optical signals inputted to said input terminals to switch optical signals to be outputted to said output terminals with a selection ratio which can be varied continuously;

phase detection means coupled to said output terminals through at least one optical receiver for detecting phase conditions of optical signals at said output terminals of said optical switch with respect to the same information signal;

optical signal conversion means attached to at least one of said input terminals of said optical switch for inputting to said optical switch an optical signal in the form of light which does not interfere with another optical signal at said output terminals of said optical switch; a feedback loop from one of said output terminals of said optical switch to said optical signal conversion means; and delay means interposed in said loop for providing a delay of a variable amount to a signal passing said loop in response to a result of detection of said phase detection means.

3. The hitless switching apparatus as claimed in claim 2, wherein said optical transmission lines are individually connected to said input terminals of said optical switch, and an optical signal from at least one of said optical transmission lines passes said loop.

4. The hitless switching apparatus as claimed in claim 2, wherein said optical signal conversion means generates an optical signal of light having a low coherence.

5. The hitless switching apparatus as claimed in claim 2, wherein said optical signal conversion means generates an optical signal off light having a wavelength different from that of another optical signal.

6. The hitless switching apparatus as claimed in claim 2, wherein an optical signal is transmitted in said loop.

7. The hitless switching apparatus as claimed in claim 2, wherein said loop interconnects opto-electric conversion means, attached to the output terminal of said optical switch, and said optical signal conversion means, said optical signal conversion means comprising an electro-optical conversion means, and whereby an electric signal is transmitted in said loop.

8. A hitless switching method using a hitless switching apparatus for creating hitless switching of optical transmission lines in an optical network, comprising the steps of:

inputting, with a plurality of optical transmission lines each connected individually to one of a plurality of input terminals of an optical switch, the same information signal being applied to two of said optical transmission lines and transmitting an optical signal from one of the two optical transmission lines to a selected one of a plurality of output terminals while another optical signal from the other of the two optical transmission lines is passed through a loop;

detecting a phase difference between the optical signals from the two optical transmission lines by a phase detection means and controlling a delay means so that the phase when the optical signal from the other optical transmission line arrives at the selected output terminal is adjusted to coincide with the phase of the optical signal from the one optical transmission line at the selected output terminal; and gradually switching the optical switch to cause the optical signal at the selected output terminal to change from the optical signal from the one optical transmission line to the optical signal from an optical signal conversion means to effect hitless switching from the one optical transmission line to the other optical transmission line.

9. A node apparatus employed in an optical network for performing hitless switching between a plurality of optical transmission lines, comprising:

an optical switching network having a plurality of input terminals and a plurality of output terminals for selecting optical signals inputted to said input terminals to switch optical signals to be outputted to said output terminals with a selection ratio which can be varied continuously;

optical receivers connected to some of said output terminals of said optical switching network;

a plurality of output optical transmission lines connected to the other output terminals of said optical switching network;

an optical transmitter connected to one of said input terminals of said optical switching network;

delay means connected with said optical transmitter, said delay means providing a delay of a variable amount to a signal to be inputted to said optical transmitter;

a plurality of input optical transmission lines connected to the other input terminals of said optical switching network; and optical signal conversion means attached to a terminal of said optical switching network for inputting an optical signal to said optical switching network;

wherein a signal based on one of said optical signals having passed said optical switching network is inputted to said optical signal conversion means and said optical signal conversion means generates an optical signal which does not cause interference with another optical signal from another node on said optical receivers.

10. The node apparatus as claimed in claim 9, wherein said optical signal conversion means generates an optical signal of light having a low coherence.

11. The node apparatus as claimed in claim 9, wherein said optical signal conversion means generates an optical signal of light having a wavelength different from that of the optical signal from another node.

12. The node apparatus as claimed in claim 9, wherein said optical signal conversion means is attached to an input terminal of said optical switching network, and further comprising a loop circuit provided outside said optical switching network for feeding back a signal from one of said optical receivers to said optical signal conversion means.

13. The node apparatus as claimed in claim 9, further comprising phase detection means for detecting a phase difference between optical signals of two different optical receivers.

14. The node apparatus as claimed in claim 9, further comprising delay adjustment means interposed in said loop for providing a delay of a variable amount to a signal passing said loop.

15. A hitless switching method for switching from a first optical transmission line to a second optical transmission line, the hitless switching method comprising the steps of:

transmitting, at a transmission side node, the same information as that being transmitted by way of the first optical transmission line into a third optical transmission line and inputting to an optical switching network, at a reception side node, a signal from the third optical transmission line to an optical signal conversion means by way of a feedback loop so as to again be inputted to said optical switching network;

adjusting, at said transmission side node, the transmission delay of the first or third optical transmission line so that, at a selected optical receiver at said reception side node which is one of a plurality of optical receivers that is receiving an optical signal from the first optical transmission line, the phase of an optical signal from said optical signal conversion means coincides with the phase of the optical signal from the first optical transmission line;

gradually switching said optical switching network so that the selected optical receiver receives the optical signal from said optical signal conversion means;

also transmitting, at said transmission side node, the same information as that being transmitted by way of the third optical transmission line to the second optical transmission line;

adjusting, at said transmission side node, the transmission delay of the second or third optical transmission line so that, at the selected optical receiver of said reception side node, the phase of the optical signal from the second optical transmission line coincides with the phase of the optical signal from said optical signal conversion means; and gradually switching said optical switching network so that the selected optical receiver receives the optical signal from the second optical transmission line.

16. The hitless switching method as claimed in claim 15, further including the steps of providing on the input side of said optical signal conversion means a delay adjustment means for providing a delay of a variable amount to a signal to be inputted to said optical signal conversion means.

17. A node apparatus which is employed in an optical network for performing hitless switching between a plurality of optical transmission lines, comprising:

an optical switching network having a plurality of input terminals and a plurality of output terminals for selecting optical signals inputted to said input terminals to switch optical signals to be outputted to said output terminals with a selection ratio which can be varied continuously;

optical receivers connected to some of said output terminals of said optical switching network;

a plurality of output optical transmission lines connected to the other output terminals of said optical switching network;

an optical transmitter connected to one of said input terminals of said optical switching network;

a plurality of input optical transmission lines connected to the other input terminals of said optical switching network;

optical delay means provided in said optical switching network for providing an arbitrary delay amount to an optical signal which passes therethrough; and optical signal conversion means attached to a terminal of said optical switching network for inputting an optical signal to said optical switching network;

wherein a signal based on one of said optical signals having passed said optical switching network is inputted to said optical signal conversion means and said optical signal conversion means generates an optical signal which does not cause interference with another optical signal from another node on said optical receivers.

18. The node apparatus as claimed in claim 17, wherein said optical signal conversion means generates an optical signal of light having a low coherence.

19. The node apparatus as claimed in claim 17, wherein said optical signal conversion means generates an optical signal of light having a wavelength different from that of the optical signal from another node.

20. The node apparatus as claimed in claim 17, wherein said optical signal conversion means is attached to an input terminal of said optical switching network, and further comprising a loop circuit provided outside said optical switching network for feeding back a signal from one of said optical receivers to said optical signal conversion means.

21. A node apparatus which is employed in an optical network for performing hitless switching between a plurality of optical transmission lines, comprising:

an optical switching network having a plurality of input terminals and a plurality of output terminals for selecting optical signals inputted to said input terminals to switch optical signals to be outputted to said output terminals with a selection ratio which can be varied continuously;

optical receivers connected to some of said output terminals of said optical switching network;

a plurality of output optical transmission lines connected to the other output terminals of said optical switching network;

an optical transmitter connected to one of said input terminals of said optical switching network;

a plurality of input optical transmission lines connected to the other input terminals of said optical switching network;

a switching network optical receiver interposed in said optical switching network; and a switching network optical transmitter interposed in said optical switching network;

wherein a signal from said switching network optical receiver being inputted to said switching network optical transmitter while said switching network optical transmitter generates an optical signal which does not cause interference with an optical signal from another node on said optical receivers.

22. The node apparatus as claimed in claim 21, wherein said switching network optical transmitter generates an optical signal of light having a low coherence.

23. The node apparatus as claimed in claim 21, wherein said switching network optical transmitter generates an optical signal of light having a wavelength different from that of the optical signal from another node.

24. The node apparatus as claimed in claim 21, wherein the delay time amounts of the routes in said optical switching network are arbitrarily variable.

25. A hitless switching method for switching from a first optical transmission line to a second optical transmission line in a hitless condition while an optical signal from the first optical transmission line is being inputted to a first optical receiver, the hitless switching method comprising the steps of:

transmitting, at a transmission side node, the same information as that being transmitted by way of the first optical transmission line into the second optical transmission line and inputting through an optical switching network, at a reception side node, a signal from the second optical transmission line to a second optical receiver;

adjusting the transmission delay through said optical switching network so that, at said first optical receiver, the phase of an optical signal from an optical signal conversion means coincides with the phase of the optical signal from the first optical transmission line;

gradually switching said optical switching network so that the first optical receiver receives the optical signal from said optical signal conversion means;

adjusting the transmission delay through said optical switching network so that, at said first optical receiver, the phase of the optical signal from said optical signal conversion means coincides with the phase of the optical signal from the second optical transmission line; and gradually switching said optical switching network so that said first optical receiver receives the optical signal from the second optical transmission line.

26. The hitless switching method as claimed in claim 25, wherein the delay time amount in said optical switching network is adjusted by varying the length of the route in said optical switching network.

27. A hitless switching apparatus which is employed in an optical network and which performs hitless switching between a plurality of optical transmission lines, comprising:

an optical switch having a plurality of input terminals and a plurality of output terminals for receiving, at two of said input terminals thereof, two optical signals transmitting the same information to perform switching of a signal at said output terminal by continuously and complimentarily varying the ratio between optical signals to be selected at said output terminals from a signal at one of said input terminals selected at present to another one of said input terminals to be selected next;

an optical receiver connected to one of said output terminals of said optical switch;

phase coincidence means for making phase conditions of the same information signals to be inputted to two of said input terminals of said optical switch coincide at said optical receiver; and optical signal conversion means connected to said optical switch for converting an optical signal to another optical signal having a low coherence, wherein hitless switching is performed by inputting the same optical signals to first and second input terminals of said optical switch and changing condition of said optical switch from a condition wherein an optical signal at said first input terminal is received at said optical receiver to another condition wherein an optical signal at said second input terminal is received by said optical receiver, and said optical signal conversion means converts said optical signal supplied to said second input terminal to said optical signal having a low coherence.

28. A node apparatus which is employed in an optical network and which performs hitless switching between a plurality of optical transmission lines, comprising:

an optical switching network having a plurality of input terminals and a plurality of output terminals for selecting optical signals inputted to said input terminals to switch optical signals to be outputted to said output terminals with a selection ratio which can be varied continuously;

optical receivers connected to some of said output terminals of said optical switching network;

a plurality of output optical transmission lines connected to the other output terminals of said optical switching network;

an optical transmitter connected to one of said input terminals of said optical switching network;

delay means connected with said optical transmitter, said delay means providing a delay of a variable amount to a signal to be inputted to said optical transmitter;

a plurality of input optical transmission lines connected to the other input terminals of said optical switching network; and optical signal conversion means interposed in said optical switching network for inputting an optical signal to said optical switching network;

wherein a signal based on one of said optical signals having passed said optical switching network is inputted to said optical signal conversion means and said optical signal conversion means generates an optical signal which does not cause interference with another optical signal from another node on said optical receivers.

29. A node apparatus which is employed in an optical network and capable of performing hitless switching between a plurality of optical transmission lines, comprising:

an optical switching network having a plurality of input terminals and a plurality of output terminals for selecting optical signals inputted to said input terminals to switch optical signals to be outputted to said output terminals with a selection ratio which can be varied continuously;

optical receivers connected to some of said output terminals of said optical switching network;

a plurality of output optical transmission lines connected to the other output terminals of said optical switching network;

an optical transmitter connected to one of said input terminals of said optical switching network;

a plurality of input optical transmission lines connected to the other input terminals of said optical switching network;

optical delay means provided in said optical switching network for providing an arbitrary delay amount to an optical signal which passes therethrough; and optical signal conversion means interposed in said optical switching network for inputting an optical signal to said optical switching network;

wherein a signal based on one of said optical signals having passed said optical switching network is inputted to said optical signal conversion means and said optical signal conversion means generates an optical signal which does not cause interference with another optical signal from another node on said optical receivers.

* * * * *

UNITED STATES PATENT AND TRADEMARK OFFICE
CERTIFICATE OF CORRECTION

PATENT NO. : 5,471,332
DATED : November 28, 1995
INVENTOR(S) : Tatsuya Shiragaki, et al.

It is certified that error appears in the above-indentified patent and that said Letters Patent is hereby corrected as shown below:

Col. 2, line 27, delete "$104_a$", insert after second occurrence of "fiber" --$104_n$--.

Col. 4, line 23, delete "anode", insert --a node--.

Col. 7, line 57, delete "tithe", insert --time--.

Col. 12, line 6, delete "Peter", insert --Perot--.

Signed and Sealed this

Sixteenth Day of July, 1996

Attest:

BRUCE LEHMAN

Attesting Officer          Commissioner of Patents and Trademarks